United States Patent [19]

Logan

[11] Patent Number: 5,146,383

[45] Date of Patent: Sep. 8, 1992

[54] MODULAR SUPERCONDUCTING MAGNETIC ENERGY STORAGE INDUCTOR

[75] Inventor: James R. Logan, Hampton Township, Allegheny County, Pa.

[73] Assignee: Westinghouse Electric Corp., Pittsburgh, Pa.

[21] Appl. No.: 540,959

[22] Filed: Jun. 20, 1990

[51] Int. Cl.⁵ .......................................... H01B 12/00
[52] U.S. Cl. ................................... 361/19; 361/141; 505/1
[58] Field of Search ............... 361/141, 143, 146, 147, 361/19; 336/145, 146, 147; 505/851, 878; 507/143, 46, 87

[56] References Cited

U.S. PATENT DOCUMENTS

| | | | |
|---|---|---|---|
| 3,356,924 | 12/1967 | Buchold | 321/8 |
| 3,502,946 | 1/1967 | Kimura | 317/155.5 |
| 3,919,677 | 11/1975 | Young et al. | 335/216 |
| 3,980,981 | 9/1976 | Boom et al. | 335/216 |
| 4,122,512 | 10/1978 | Peterson et al. | 363/14 |
| 4,622,531 | 11/1986 | Eyssa et al. | 335/216 |

Primary Examiner—A. D. Pellinen
Assistant Examiner—Aditya Krishnan
Attorney, Agent, or Firm—M. G. Panian

[57] ABSTRACT

A modular superconducting magnetic energy storage (SMES) inductor includes a plurality of vertically adjacent winding modules each comprising a number of serially connected concentric solenoid coils. Pairs of adjacent winding modules are connected in series to form paired winding modules each of which occupies a compartment in a sectioned dewar. Only a single shorting switch is provided for each winding module for use during an emergency dump of cryogenic fluid from the dewar. Adjacent paired winding modules can be connected in series by a single connector penetrating sectional plates between dewar compartments. Arrangements of bypass switches provide the capability of taking either a single winding module or a pair of winding modules out of service while the remaining winding modules and pairs of winding modules remain in service. Any number of pairs of winding modules can be connected in one or more series circuits each serviced by its own power conversion system to achieve a desired energy storage capability.

22 Claims, 6 Drawing Sheets

MODULAR SUPERCONDUCTING MAGNETIC ENERGY STORAGE INDUCTOR

The U.S. government has a paid-up license in this invention and the right in limited circumstances to require the patent owner to license others on reasonable terms as provided for by the terms of Contract No. DNA 001-88-C-0027 awarded by the Defense Nuclear Agency.

BACKGROUND OF THE INVENTION

1. Field of the Invention

This invention relates to large superconducting energy storage magnets and particularly to a modular construction of such magnets with shorting switches for emergency dissipation of energy.

2. Background Information

Superconducting magnetic energy storage (SMES) inductors or magnets are very large inductors made of superconducting materials which are capable of storing large amounts of energy and/or generating large magnetic fields SMES inductors are very efficient for these purposes because no energy is lost to resistive heating in the superconducting current path. SMES inductors are operated at cryogenic temperatures. If a section of the inductor goes normal (exits the superconducting state), that section will rapidly overheat unless protective measures are taken. One well known protective procedure is to drive the entire inductor normal, so that the energy is dissipated evenly throughout the inductor.

SMES inductors are hundreds or thousands of feet in diameter. Typically, they are large solenoids. Presently designed implementations have two or four layers of turns. Each layer extends the full height of the inductor and is tens of feet high, but only inches wide. These inductors are bath cooled by immersing the superconducting path in a pool of coolant, such as liquid helium. The dewar, which is the vessel holding the coolant, is tens of feet high, but only several feet wide. Commonly, for ease of construction, the dewar is divided into sections with transverse plates between, although these sections are usually interconnected to form one heat transfer unit. Since each layer of turns extends the full height of the inductor, each must penetrate the plates between sections of the dewar.

The layers of the SMES inductor are connected in series or parallel, or some combination of series and parallel. If adjacent ends of two layers are connected together so that the current flows upward in one layer and downward in the other, the layers must be wound in opposite directions so that the magnetic flux produced by the two layers is in the same direction. While this arrangement has the advantage of short connections between the layers, it produces higher internal voltages between layers. Alternatively, layers can be connected in series by cross connections which connect opposite ends of adjacent layers together so that the current flows in the same direction through both coils and therefore both coils are wound in the same direction. This has the advantage of reducing layer to layer voltages but requires very long cross connectors.

With the present technological state of the art, SMES inductors have inherent limitations on their terminal voltages and currents. If more power must be extracted/inserted into an inductor than is practical through a single set of leads, the layers can be connected to provide two parallel circuits. A typical arrangement in a four layer inductor is to have two parallel circuits each having two layers connected in series.

When a problem occurs in the SMES inductor, the coolant is drained out of the dewar over a period of time, such as 30 to 40 seconds. As the liquid coolant level drops below turns, the uncovered turns become normal. With the draining of the liquid coolant from the dewar, the SMES coil doubles as a dump resistor. That is, the coil is an inductor which stores energy, but also becomes a resistor which dissipates the energy. The process of draining the liquid coolant and dissipating the coil energy is known as a protection dump. Although the coil terminals are grounded during a protection dump, voltages to ground are generated internal to the inductor during this procedure. This arises because the resistance and inductance are not distributed equally per unit length of the inductor. The turns at the center of the inductor have the highest total inductance while the turns on the top of the inductor have the highest resistance. The turns at the top of the inductor have the highest resistance because resistance is a function of temperature, and the top begins to heat first as the coolant level drops. To manage the voltages that develop internal to the coil during a protection dump, it has been proposed that shorting switches be used to short each layer of the inductor periodically along its length. Thus, the number of shorting switches required is equal to the number of switches per layer multiplied by the number of layers. For instance, in a four layer inductor in which each layer is shorted by four shorting switches, a total of sixteen shorting switches are required. All sixteen shorting switches must operate to reduce the internal voltages to the desired levels.

It is an object of the present invention to provide an improved SMES inductor.

More particularly, it is object of the invention to provide such an improved SMES inductor in which a protection dump can be performed with fewer shorting switches than presently possible.

It is another object of the invention to provide such an improved inductor with fewer penetrations required between dewar sections.

It is also an object of the invention to provide such an inductor in which sections of the inductor can be taken out of service easily.

It is another object of the invention to provide such an inductor which can be easily scaled to any size required.

It is yet another object of the invention to provide such an inductor which can be easily and economically fabricated.

SUMMARY OF THE INVENTION

These and other objects are realized by the invention which is directed to an SMES inductor comprising a plurality of winding modules interconnected in one or more electrical circuits within the dewar containing the cryogenic fluid. Each of the winding modules comprises a multi-layer, layer wound winding of superconducting material. The winding modules are stacked one on top of another in the dewar immersed in the cryogenic fluid. A single shorting switch is connected across the winding of each of the winding modules.

Each of the winding modules comprises a plurality of concentric solenoid coils, preferably connected in series. An even number of solenoid coils is used in each module in order to balance the magnetic forces, and preferably the layers are wound in opposite directions so that magnetic flux produced by the two layers is in the same direction.

In the preferred form of the invention, the module windings are paired to form vertically adjacent pairs of winding modules with the solenoid coils of the two winding modules connected in series. Preferably, the outer most of the concentric solenoid coils in the two winding modules of a pair are connected together, and preferably, at adjacent ends. Adjacent ends of the innermost coils of the windings in the two pairs of winding modules are connected to terminal leads. In this configuration, the single shorting switch for one of the modules in the pair may be across the terminal leads. The terminal leads of any number of adjacent pairs of module windings may be connected together to place the pairs of module windings in series. There may be one or more such series circuits of adjacent pairs of modular windings.

Adjacent coils in a winding module may be wound in opposite directions with one adjacent end of the adjacent coils connected together to reduce the length of the leads between the solenoid coils.

A failed module can be taken out of the circuit by closing the module shorting switch and opening a by-pass switch for the module. In addition, a pair of winding modules can be taken out of service by a shunt across the module terminals, a first by-pass switch in the connection between the two modules within the module pair and a second by-pass switch in the shunt.

There are many advantages to this improved design for a SMES inductor. First, it greatly simplifies the design by reducing the number of shorting switches required by a factor equal to the number of layers in the winding. It also eliminates the shorting switch bus and reduces layer to layer cross over leads. In addition, the modular design utilizes coil modules which match the dewar modules. It also reduces the number of conductor paths required through or around the module plates of the dewar. Furthermore, the modular design improves scalability. The layer to layer voltages and the module to module voltages are approximately the same for a range of sizes of the SMES inductor. Reliability is also increased by the reduction of the number of shorting switches required, multiple current paths can be physically separated in different module pairs, lower modules can be room temperature tested before upper modules are built, and for a unit with many module pairs, the bad module pairs can be jumpered across as a repair.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figures 1, 1A:
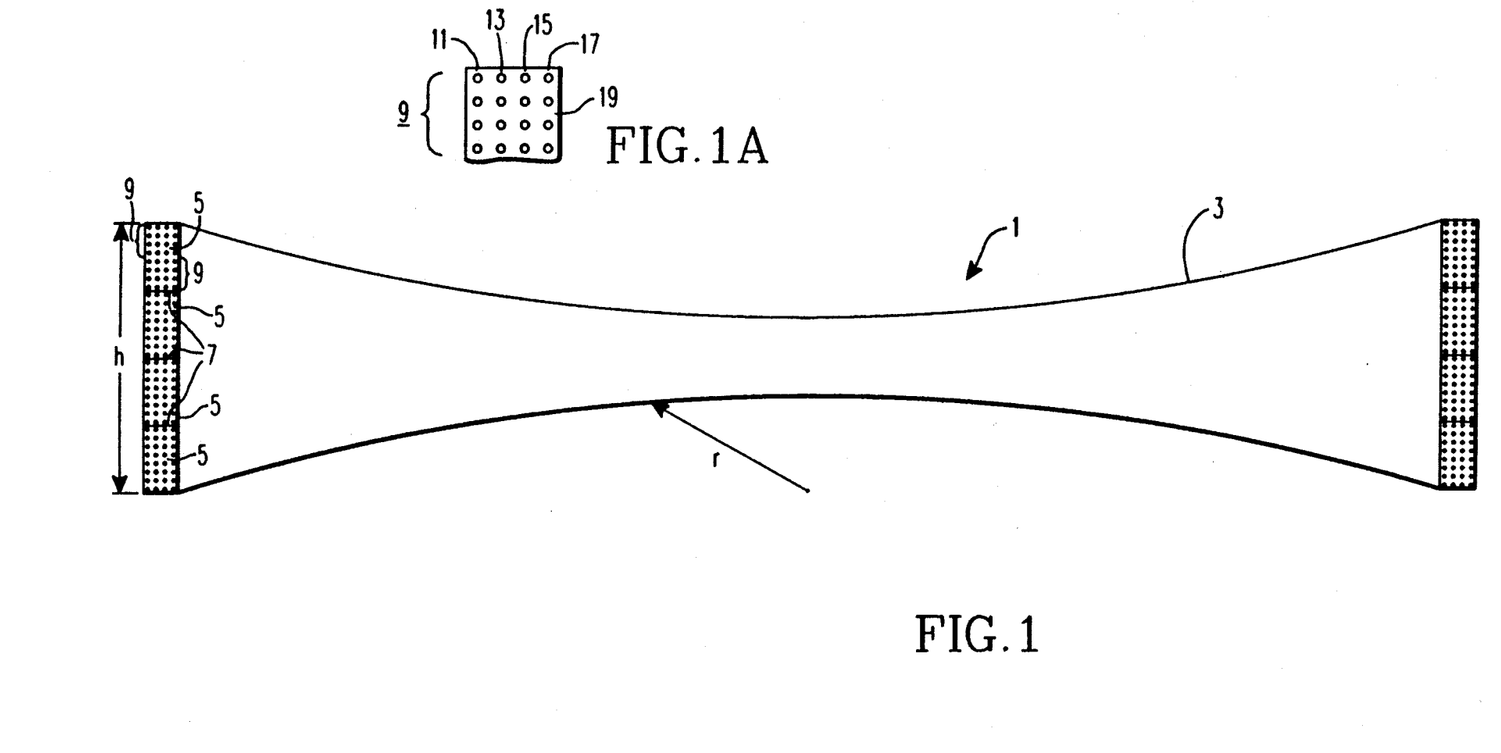
FIG. 1 is an elevation sectional view in perspective through a diameter of an SMES inductor in accordance with the invention with a portion shown in enlarged scale in FIG. 1A.

FIG. 1 illustrates a section through a superconducting magnetic energy storage (SMES) inductor 1 in accordance with the invention. The SMES inductor 1 comprises a large annular dewar 3 having a radius r of several hundred to several thousand feet, and a height h of tens of feet. The dewar 3 is compartmentalized into vertically aligned compartments 5 by section plates 7. Typically, all of the compartments 5 are interconnected hydraulically to form one heat exchanger chamber. Stacked one upon each other in each of the compartments 5 of the dewar 3 are a plurality of winding modules 9. Each of the winding modules 9 is a multi-layered, layer wound coil winding, or series of concentric solenoid coils, for example solenoid coils 11, 13, 15 and 17. The solenoid coils are made of superconducting materials, and are immersed in a cryogenic fluid such as liquid helium 19 within the dewar 3. As will be seen, typically, the solenoids in the winding modules are connected in series, while the modules may be connected in groups in series to form one or more electrical circuits.

The dewar 3 is filled with a cryogenic fluid 19 such as liquid helium which maintains the winding modules 9 at a temperature at which the solenoid coils are superconducting. As was discussed previously, under certain circumstances, such as where a portion of the windings in the SMES go normal, which could lead to excessive heating and damage to the SMES, the cryogenic fluid 19 is rapidly dumped so that all of the winding modules 9 go normal and the entire SMES becomes resistive to dissipate the stored energy evenly throughout the SMES. Dumping of the cryogenic fluid 19 takes a finite time, for instance on the order of 30 to 40 seconds, so that the modules near the top of the SMES become normal before the lower modules.

Figure 2:
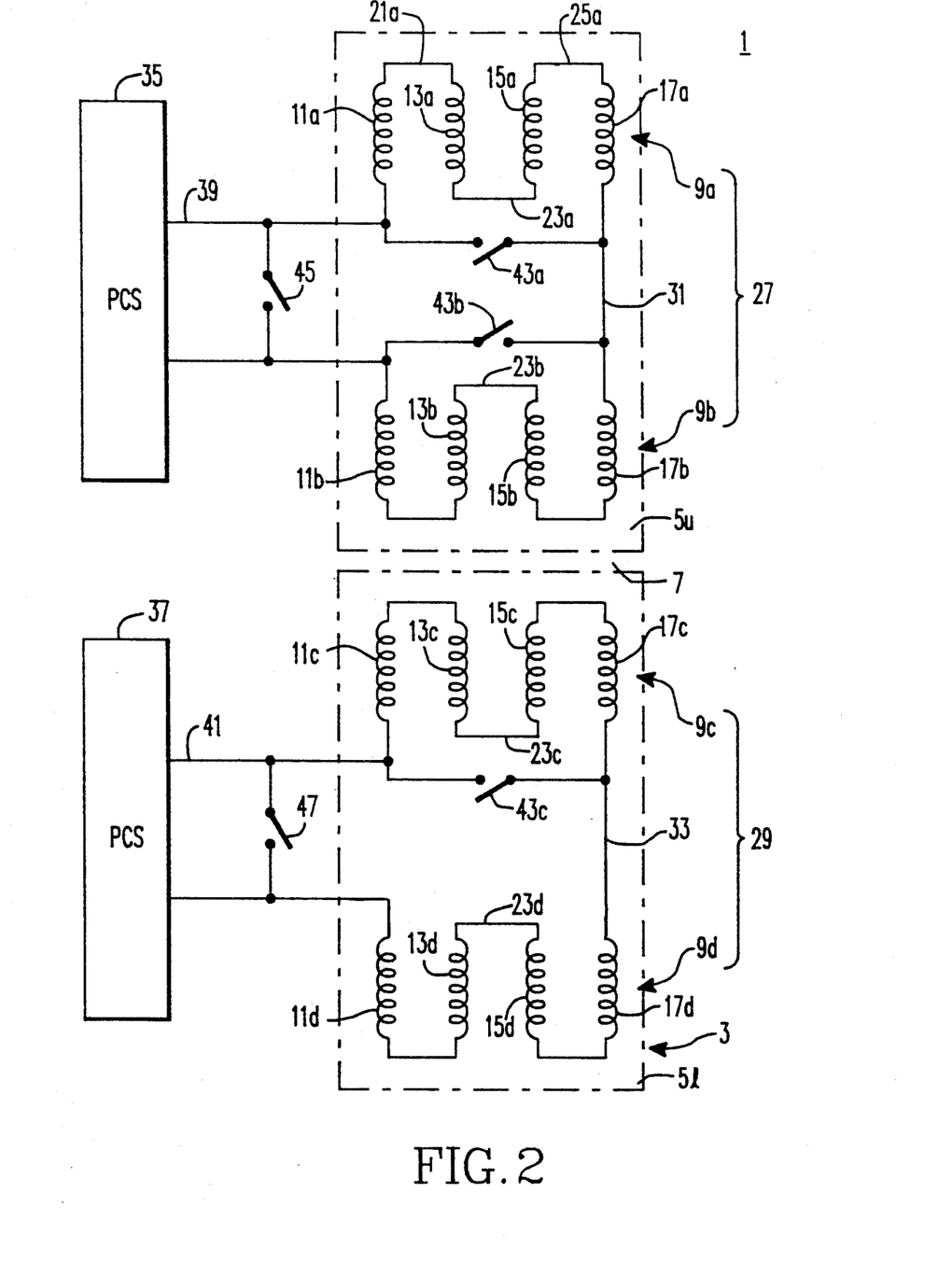
FIG. 2 is a schematic diagram of an SMES inductor having two pairs of winding modules in accordance with the invention.

FIG. 2 is a schematic diagram illustrating a small SMES in accordance with the invention having four winding modules 9a, through 9d. While each of the windings 11, 13, 15 and 17, in each of the modules is solenoid wound in the manner indicated in FIG. 1, these coils are shown symbolically in FIG. 2 for clarity in presentation. All four coils in each of the modules are connected in series. In the exemplary modules, adjacent ends of adjacent modules are connected together. Thus, the upper ends of the coils 11a and 13a in module 9a are connected by a connector 21a while the lower ends of the coils 13a and 15a are connected by the connector 23a and the upper end of coil 15a is connected to the upper end of 17a by the connector 25a. This configuration shortens the length of the connectors 21, 23 and 25; however, since the flux produced by all of the coils must be in the same direction, adjacent coils must be wound in opposite directions. This is indicated by the opposite direction of the turns, for instance in the coils 11a and 13a, as shown in FIG. 2. As further shown in FIG. 2, the winding modules 9 are paired to form pairs of winding modules 27 made up of winding modules 9a and 9b, and pair 29 made up of winding modules 9c and 9d. The two winding modules in each pair are connected in series by the connectors 31 and 33, respectively. In the configuration shown in FIG. 2, the adjacent ends of the outermost coils, for instance 17a and 17b, are connected together which shortens the length of the connector 31. In the SMES inductor of FIG. 2, each of the module pairs 27 and 29 occupy a separate compartment 5U and 5L in the dewar 3. As shown in FIG. 2, the two pairs of winding modules are connected in separate circuits to their own power conversion systems (PCS) 35 and 37. Thus, there are no penetrations required through the section plate 7 of the dewar 3 since the two pairs of winding modules are not interconnected. The pairs of winding modules 27 and 29 are connected to the associated power conversion systems 35 and 37 through terminal leads 39 and 41, respectively.

To manage the voltages that develop internal to the coil windings, each of the modules 9 is provided with a shorting switch 43a-43c for the modules 9a through 9c. External switches 45 and 47 short the terminal leads 39 and 41 for the power conversion systems 35 and 37 respectively. These external switches can serve as the shorting switch for one of the modules as indicated for the module 9d where the switch 47 serves as the shorting swich for that module.

Figure 3:
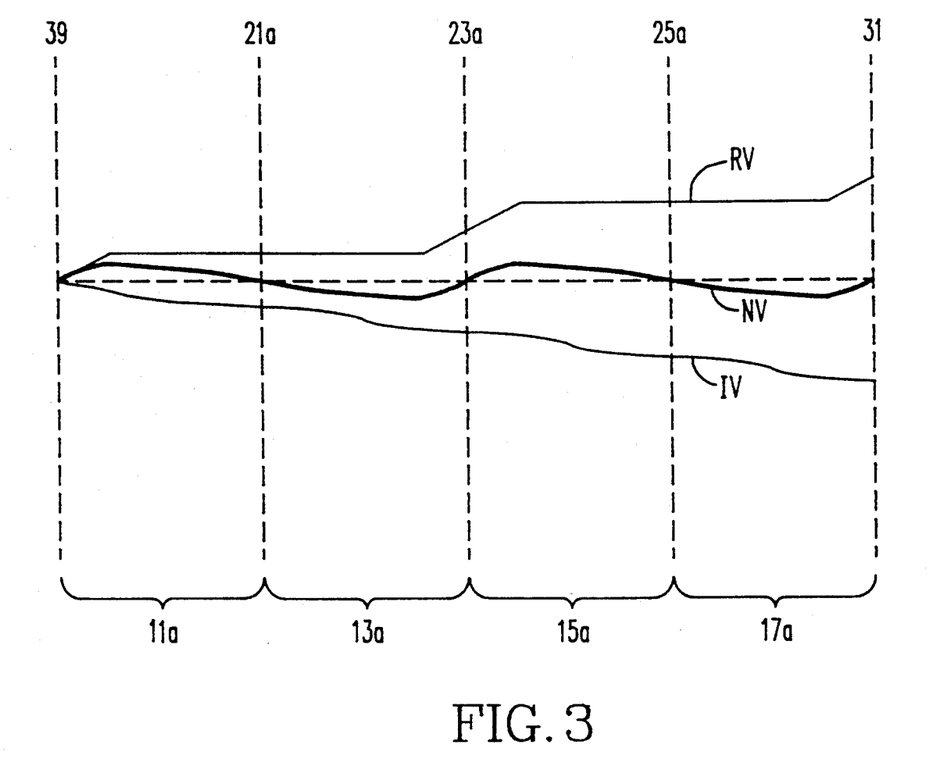
FIG. 3 is a diagram illustrating the voltages in the SMES inductor of FIG. 2 with the shorting switches closed during an emergency dump.

Because of the symmetry of the layer wound coils of the modules 9, each layer wound coil 11, 13, 15 and 17 can be considered independently during the emergency dump, provided the coolant level falls from top to bottom. Since these coils have such small aspect ratios (h/r), the inductance of each coil is approximately the same. Each layer has the same spatial resistive voltage distribution on it, since each layer has the same current through it, and the same spatial distribution of normal and superconducting areas. By symmetry, each coil 11, 13, 15 and 17 will have the same inductive back EMF on it, since each coil has the same self inductance and mutual inductances with the other coils. Therefore, regardless of how the coils are connected, both ends of each coil are at ground potential, at least to a first approximation. This assumes that the terminals of the overall device are shorted. Considering the module 9a of FIG. 2 for illustration, each of the four coils 11a, 11b, 11c and 11d will have the inductive (IV), resistive (RV) and net voltage (NV) to ground distributions illustrated in FIG. 3 with the voltages at the end of the coils identified by the reference character for the conductor connected to the respective ends of the coils. In the example illustrated in FIG. 3, the module is one-quarter uncovered by the helium pool during a protection dump.

Figure 4:
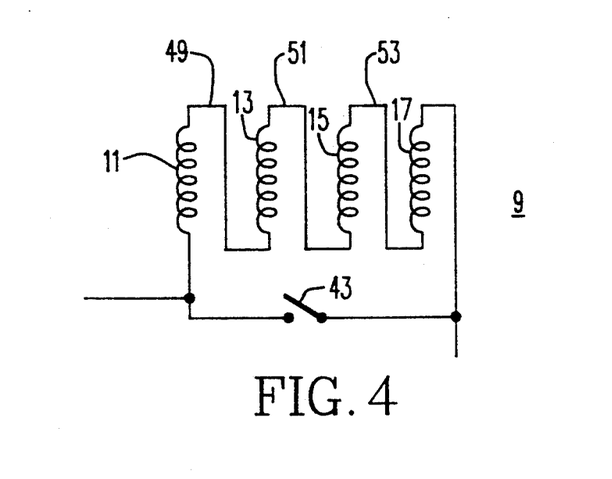
FIG. 4 is a schematic diagram illustrating an alternative winding configuration for a single winding module of the SMES inductor of FIG. 2.

As an alternative to the arrangement shown in FIG. 2, the coils 11, 13, 15 and 17 of the winding modules 9 can be connected at opposite ends in series by connectors 49, 51, and 53 as shown in the single module illustrated in FIG. 4. This module is also protected by a shorting switch 43. This configuration has the advantage that the coil voltages during a dump are lower than in the arrangement in FIG. 2, and the currents all flow in the same direction; however, longer connectors are required.

Figure 5:
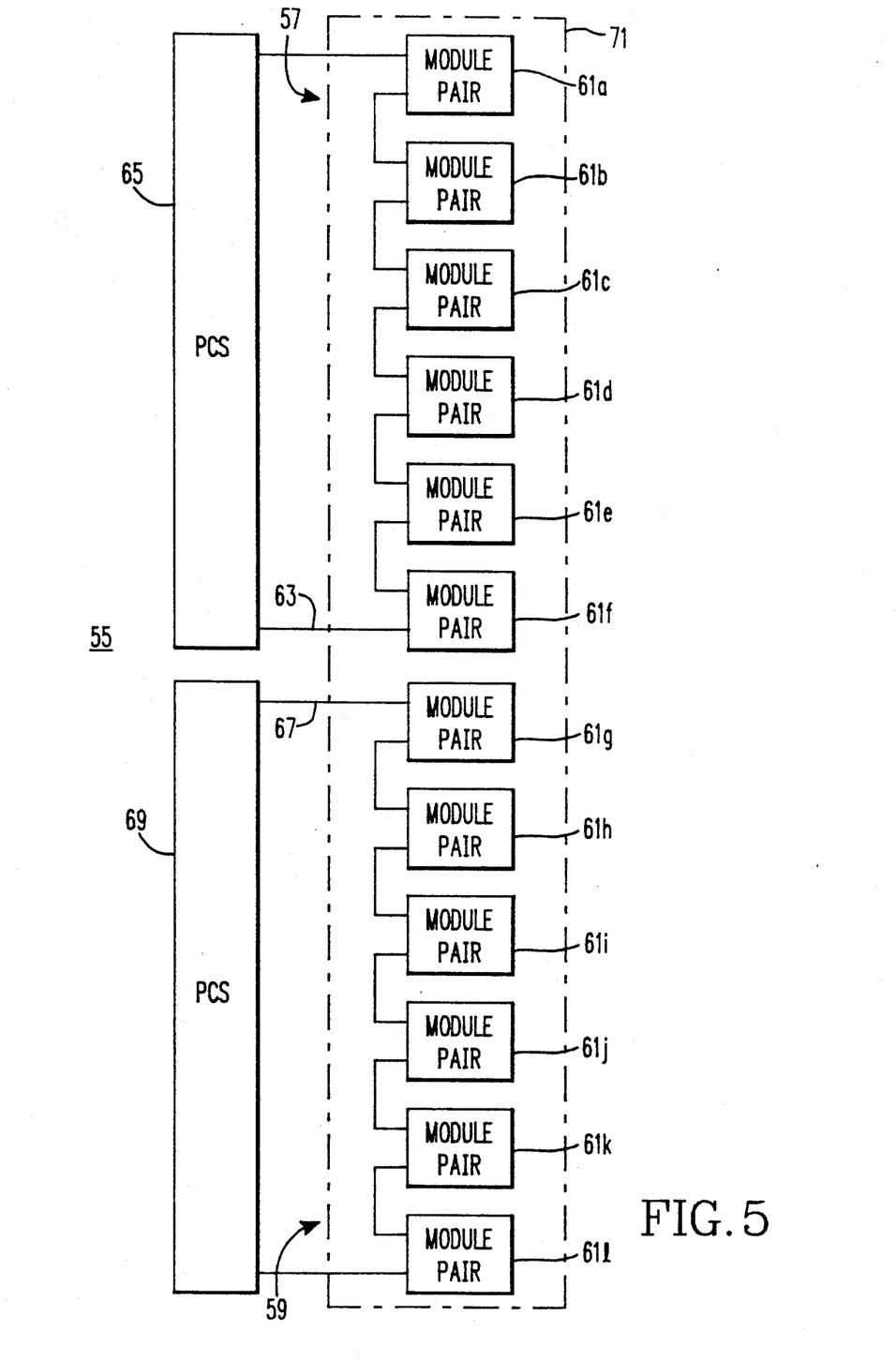
FIG. 5 illustrates schematically an exemplary large scale SMES inductor in accordance with the invention.

A large scale SMES 55 made up of two groups 57 and 59 of module pairs 61 is shown in FIG. 5. The first group of modules 57 comprising the modules 61a through 61f are all connected in series and through terminal leads 63 to a power conversion system 65. Similarly, the second group of modules 59 comprising the modules 61g through 61l are connected in series and through the terminal leads 67 to a separate power conversion system 69. The module pairs 61a through 61l are stacked one on top of each other within the dewar 71. As can be appreciated, any size SMES can be constructed from the modular coil pairs, and can be arranged in any number of separate series circuits each served by its own power conversion system.

Figure 6:
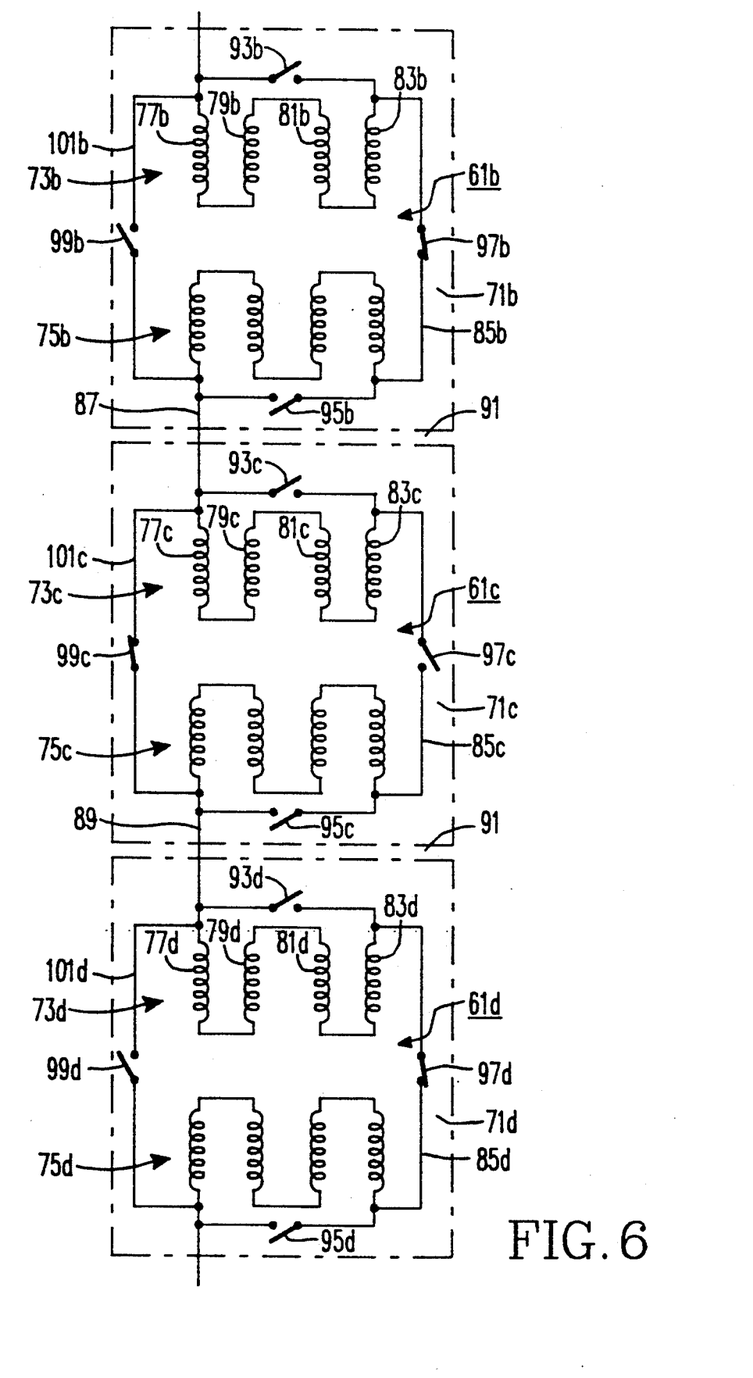
FIG. 6 is a schematic illustration in more detail of a portion of the SMES inductor of FIG. 5.

FIG. 6 illustrates in more detail a portion of the full size SMES 55 shown in FIG. 5. More particularly, FIG. 6 illustrates the three module pairs 61b through 61d. Each of these module pairs 61 includes modules 73 and 75 each having four solenoid coils 77, 79, 81, and 83 connected in series. The winding modules 73 and 75 are connected in series at the remote ends of the outer coils 83 by connectors 85. This permits the use of shorter connectors 87 and 89 connecting adjacent module pairs in series. As will be noted only these single leads 87 and 89 are required to penetrate the section plates 91 between units of the dewar 71. Again, each of the winding modules is provided with a single shorting switch 93, for the modules 73 and 95 for the modules 75.

As an additional feature of the invention, any one of the module pairs 61 may be removed from service without affecting the remainder of the SMES. This could be done for instance when a module fails, to preclude the need for shut down of the entire SMES. This feature is provided by a pair of bypass switches 97 and 99 for each of the module pairs. The bypass switch 97 is provided in the connector 85 connecting the winding modules 73 and 75 of the module pair 61. The second bypass switch 99 is provided in a shunt 101 which is in parallel with the module pair. For normal operation, the switches 97 are closed and the switches 99 are open as shown for the modules 61b and 61d in FIG. 6. When a failed module is to be removed from the circuit, the switch 97 is opened and switch 99 is closed as shown for the winding module pair 61c in FIG. 6.

Figure 7:
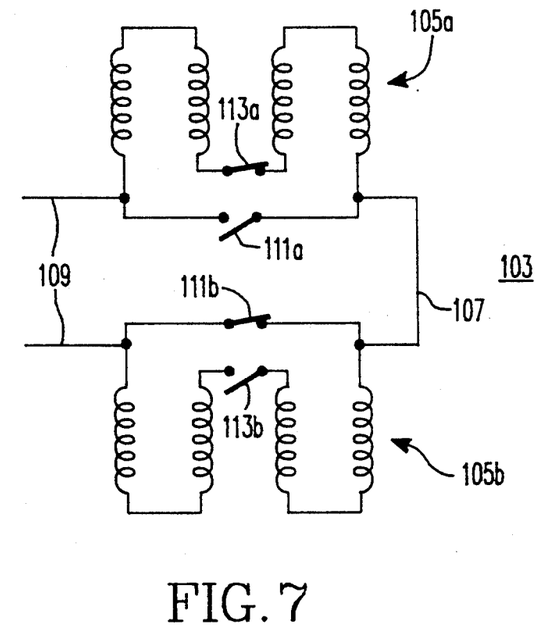
FIG. 7 is a schematic illustration of one-half of the SMES inductor of FIG. 2 modified to permit bypassing of a single winding module.

It is also possible to remove only one of the winding modules in a winding module pair. FIG. 7 illustrates an example of such an arrangement in which a winding module pair includes the winding modules 105a and 105b connected in series by the connector 107 and the terminal leads 109. Each winding module 105a and 105b has a single shorting switch 111a and 111b respectively. Each of the winding modules 105a and 105b is also provided with a bypass switch 113a and 113b. This bypass switch may be located anywhere in the series circuit of the winding module 105 and is normally closed When the module is to be bypassed, the associated bypass switch 113 is opened and the associated shorting switch 111 is closed as shown for the module 105b in FIG. 7.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A modular superconducting magnetic energy storage inductor apparatus comprising:
    an annular dewar structure oriented in a substantially horizontal plane and containing a cryogenic fluid;
    a plurality of winding modules each comprising a multi-layer, layer wound winding of superconducting material, said winding modules stacked one on top of another in said annular dewar and immersed in said cryogenic fluid;

means interconnecting said plurality of winding modules in at least one electrical circuit; and shorting switch means comprising for each winding module a single shorting switch connected across the winding of the winding module and selectively shorting the winding during an emergency dump of said cryogenic fluid from said dewar.

2. The apparatus of claim 1 wherein said multi-layer, layer wound winding of each winding module comprises a plurality of concentric solenoid coils connected in series.

3. The apparatus of claim 2 wherein said plurality of concentric solenoid coils comprises an even number of said coils.

4. The apparatus of claim 2 wherein radially adjacent solenoid coils in said winding modules are wound in opposite directions with one adjacent end of said radially adjacent solenoid coils connected together in series.

5. The apparatus of claim 2 wherein said winding modules are paired to form pairs of vertically adjacent winding modules by connectors connecting one end coil of one winding module in a pair in series with one end coil of another winding module of the pair, and with the other end coils of said one and said other winding module in the pair connected to terminal leads.

6. The apparatus of claim 5 wherein said single shorting switch for a first of said winding modules in a pair shunts said first winding module and the single shorting switch for the second winding module in the pair shunts said terminal leads.

7. The apparatus of claim 5 including bypass means selectively bypassing a pair of winding modules.

8. The apparatus of claim 7 wherein said bypass means comprises a shunt in parallel with said pair of winding modules, a first bypass switch in series with said series connected first and second winding modules, which first bypass switch is normally closed and is only opened for bypassing, and a second bypass switch in said shunt, said second bypass switch being normally open and only being closed for bypassing.

9. The apparatus of claim 5 wherein said dewar is divided into vertically aligned sections by generally horizontal section plates and wherein each pair of winding modules is located in one of said sections of said dewar.

10. The apparatus of claim 9 wherein adjacent pairs of winding modules are connected in series by a single connector extending through a section plate separating said adjacent pairs of winding modules.

11. The apparatus of claim 5 including a plurality of power conversion systems, and means connecting at least one pair of modules to each power conversion system.

12. The apparatus of claim 11 wherein a group of pairs of modules are connected in series to each power conversion system.

13. The apparatus of claim 12 including bypass means for bypassing a selected pair of winding modules in a group of pairs of winding modules 14. The apparatus of claim 13 wherein said bypass means comprises a shunt in parallel with the selected pair of winding modules, a first bypass switch connected in series with the selected pair of winding modules and a second bypass switch connected in said shunt.

15. The apparatus of claim 5 wherein adjacent ends of said end coils in said vertically adjacent pair of winding modules are connected in series, and wherein adjacent ends of said other end coils are connected to said terminal leads.

16. The apparatus of claim 15 wherein adjacent coils in each winding module are wound in opposite directions and including connections connecting adjacent ends of the oppositely wound adjacent coils together in series.

17. The apparatus of claim 16 wherein said one end coil of each winding module in each pair of winding modules is the outermost of said concentric solenoid coils.

18. The apparatus of claim 5 wherein the remote ends of said one end coils of the winding modules in said pair of winding modules are connected by said connecting means, and where the remote ends of the other end coils are connected to said terminal leads.

19. The apparatus of claim 18 wherein adjacent solenoid coils in each winding module of said pair of winding modules are wound in opposite directions and including connecting means connecting one adjacent end of said adjacent solenoid coils together to connect the coils of each winding module in series.

20. The apparatus of claim 19 wherein said one end coil of each winding module in each pair of winding modules is the outermost of said concentric solenoid coils.

21. The apparatus of claim 2 including means for bypassing a selected winding module.

22. The apparatus of claim 21 wherein said bypass means includes a bypass switch in series with the solenoid coils of said winding module said bypass switch being closed for normal operation and for said emergency dump but being open together with said single shorting switch for the module for bypassing said winding module.

* * * * *